United States Patent [19]

Anglikowski et al.

[11] Patent Number: 4,736,404
[45] Date of Patent: Apr. 5, 1988

[54] SECURITY ARRANGEMENT FOR CORDLESS TELEPHONE SYSTEM

[75] Inventors: Ronald E. Anglikowski, Marlboro, N.J.; Nissin Habib, Palm City, Fla.; Arden B. Wright, Freehold, N.J.

[73] Assignee: American Telephone and Telegraph Company, AT&T Technologies Inc., Murray Hill, N.J.

[21] Appl. No.: 718,037

[22] Filed: Mar. 29, 1985

[51] Int. Cl.4 .......................... H04M 1/66; H04B 1/26
[52] U.S. Cl. ........................................ 379/62; 379/188
[58] Field of Search .............. 179/2 EA, 2 E; 379/58, 379/61, 62, 188; 455/54

[56] References Cited

U.S. PATENT DOCUMENTS

| | | | |
|---|---|---|---|
| 4,436,957 | 3/1984 | Mazza et al. | 179/2 EA |
| 4,467,140 | 8/1984 | Fathauer et al. | 179/2 EA |
| 4,471,166 | 9/1984 | Cripps | 179/2 EA |
| 4,535,200 | 8/1985 | Himmelbauer et al. | 179/2 EA |
| 4,560,832 | 12/1985 | Bond et al. | 179/2 EA |
| 4,593,155 | 6/1986 | Hawkins | 179/2 EA |

FOREIGN PATENT DOCUMENTS 2541539  8/1984  France .................................. 379/62

Primary Examiner—James L. Dwyer
Attorney, Agent, or Firm—Samuel R. Williamson

[57] ABSTRACT

A security system for cordless telephones prevents unauthorized telephone calls over telephone lines. The system includes a base unit and a cordless handset unit which must share common information for proper operation. To prevent an unauthorized user in possession of a handset unit from easily matching a security code stored in the base unit and thereby obtain dial tone therefrom, the security code in the base unit is transferred to the handset unit while the handset unit is in a mating cradle in the base unit. Transfer circuits in the base unit and the handset unit respectively transmit and receive the security code and also an operating frequency channel over a direct-current charging path provided for charging of a battery in the handset unit whenever the handset unit is returned to the cradle.

17 Claims, 2 Drawing Sheets

SECURITY ARRANGEMENT FOR CORDLESS TELEPHONE SYSTEM

BACKGROUND OF THE INVENTION

1. Technical Field

This invention relates to cordless telephone systems and more particularly to systems that include security arrangements for preventing unauthorized use of such systems.

2. Description of the Prior Art

A typical cordless telephone system includes a handset or remote unit and a base unit. The base unit is connected to the telephone lines and includes an antenna, a transmitter and a receiver for communicating a radio frequency carrier signal that is modulated by switching signals and audio signals to and from the handset unit as appropriate. The handset unit includes a speaker and a microphone, and also an antenna, a transmitter and a receiver for likewise communicating telephone switching signals and auido signals to and from the base unit.

In the operation of a typical cordless telephone system, per the transmitter in the handset unit is enabled causing a control signal to be generated and transmitted to the the base unit. Upon receipt and detection of the control signal, the base unit seizes the telephone lines so as to enable audio signals and dialing signals from the handset unit that are received by the base unit within a given audio frequency band to be passed onto the telephone lines. While such an arrangement was found satisfactory while cordless telephones were few in number, it appears to be unacceptable today since there are only a few allocated frequencies for cordless telephone systems and many more cordless systems are now being employed. Because of this, many users are, in fact, assigned the same frequencies for transmitting and receiving. People cognizant of this fact have used the handset or remote unit to place unauthorized telephone calls over the telephone lines of other users.

In order to prevent the placing of unauthorized telephone calls, one widely used system in the known art utilizes a control code that is determined by switches manually preset in both the handset unit and the base unit. Only after receipt of a signal with this control code from the handset unit and a favorable comparison thereof with the control code stored by the base unit, does the base unit allow the telephone lines to be seized by the handset unit for placing a telephone call. The possibility of mismatching the common information in the two sets of switches is high, however, and the number of switches is therefore usually kept to a small number. This increases the opportunity for an unauthorized user to place telephone calls over the telephone lines of other cordless telephone system owners if he is able to discover the correct control code for causing a base unit to provide dial tone to the handset unit of his cordless telephone system. With the range of communication between a base unit and a handset unit easily being a few hundred feet, it is quite feasible that a person may travel around in an automobile with the handset unit until he receives dial tone and then place a call over another person's telephone lines.

In another security system for use with cordless telephones, preselected digits are set in the base unit by means of switches. The selected digits must then be dialed by the handset unit before dialing the desired telephone number. If a favorable comparison is had between the dialed digits and those digits set by the switches, the security system connects the telephone line to the base unit and allows dial tone to be transmitted thereby enabling a call to be implemented by the user. This system has improved security over some other known systems. It has the disadvantage, however, of requiring additional digits to be dialed before those of a desired telephone number each time a telephone call is made.

Still another system uses the radio frequency link between the base unit and the handset unit to set the security code. The security code is manually set in the base unit by means of switches and then automatically set in the handset unit via the radio frequency link by the base unit. In that the security code is transmitted from the base unit to the handset unit, reception of this code is quite possible for a would be unauthorized user who has knowledge of the operation of this type of cordless telephone system.

While the foregoing cordless telephone systems have been generally satisfactory in the past, it is now technically feasible and desirable to provide a cordless telephone system that provides increased security while being relatively inexpensive and easy to operate.

SUMMARY OF THE INVENTION

In accordance with the invention, there is provided a security arrangement suitable for use in a cordless telephone system for preventing unauthorized telephone calls over telephone lines. The system is arranged to include a base unit which shares common information with a cordless handset unit. Before a call may be placed from the handset unit, this information must be provided from the handset unit to the base unit and a favorable comparison thereof made by the base unit. In operation, the handset unit is used to contact the base unit to initiate the placing of a call. The base unit then transmits and receives audio signals from the handset unit and couples these signals onto the telephone lines. In order to prevent an unauthorized user in possession of a handset unit from obtaining dial tone from the base unit, a predetermined security code stored in the base unit is transferred to the handset unit while the handset unit is located in a mating cradle in the base unit. The battery that allows for operation of the handset unit while remote from the base unit is normally charged when the handset unit is placed in this position. A direct-current charging path established for charging of the battery also allows transfer circuits in the base unit and the handset unit to respectfully transmit and receive the security code and also an operating frequency channel over this path.

A voltage level detection circuit in accordance with the invention recognizes when the handset unit is in the cradle in the base unit. If the handset unit is in the cradle, the base unit is prompted to load its security code and channel information into the handset unit. It does this by pulsing the battery charging voltage that then exists across a set of common contacts between the base unit and the handset unit to form a binary coded pulse stream of data which is detected and stored by the handset unit.

The security arrangement is suitable for use with a cordless telephone set employing manual switches only in the base unit, or alternatively, only in the handset unit, these switches being reset by a subscriber as often as is felt appropriate. Security is enchanced by this arrangement and the possibility of mismatching the common information in two sets of switches is avoided.

The arrangement is also readily employable with a microcomputer providing operational control in the base unit or in both the base unit and the handset unit. In such arrangements, the microcomputer handles the tasks of generating the security code and selecting the operating frequency channel. The security code is then readily changed each time the handset unit is placed in the cradle to maximize security. Also, by employing a microcomputer, an increased number of digits may easily be used in the security code with no noticeable difference in operation of the handset unit by a user since the computer will handle the entire process of selecting the code and transmitting it as appropriate. The user is only required to use the handset unit in a normal way by returning the handset unit to the base unit periodically for recharging of the battery. And should the user not return the handset unit to the base unit in a timely manner and the battery discharges below the required operating level, the user simply recognizes that the handset unit is inoperative and the first thing he does is return the handset unit to the cradle in the base unit for recharging of the battery. By this simple step, not only has the user taken the necessary action to recharge the battery, but he has also taken all the action required to have the handset unit reconfigured with the appropriate security code and frequency channel,

BRIEF DESCRIPTION OF THE DRAWINGS

The invention and its mode of operation will be more clearly understood from the following detailed description when read with the appended drawing in which.

DETAILED DESCRIPTION

Figure 1:
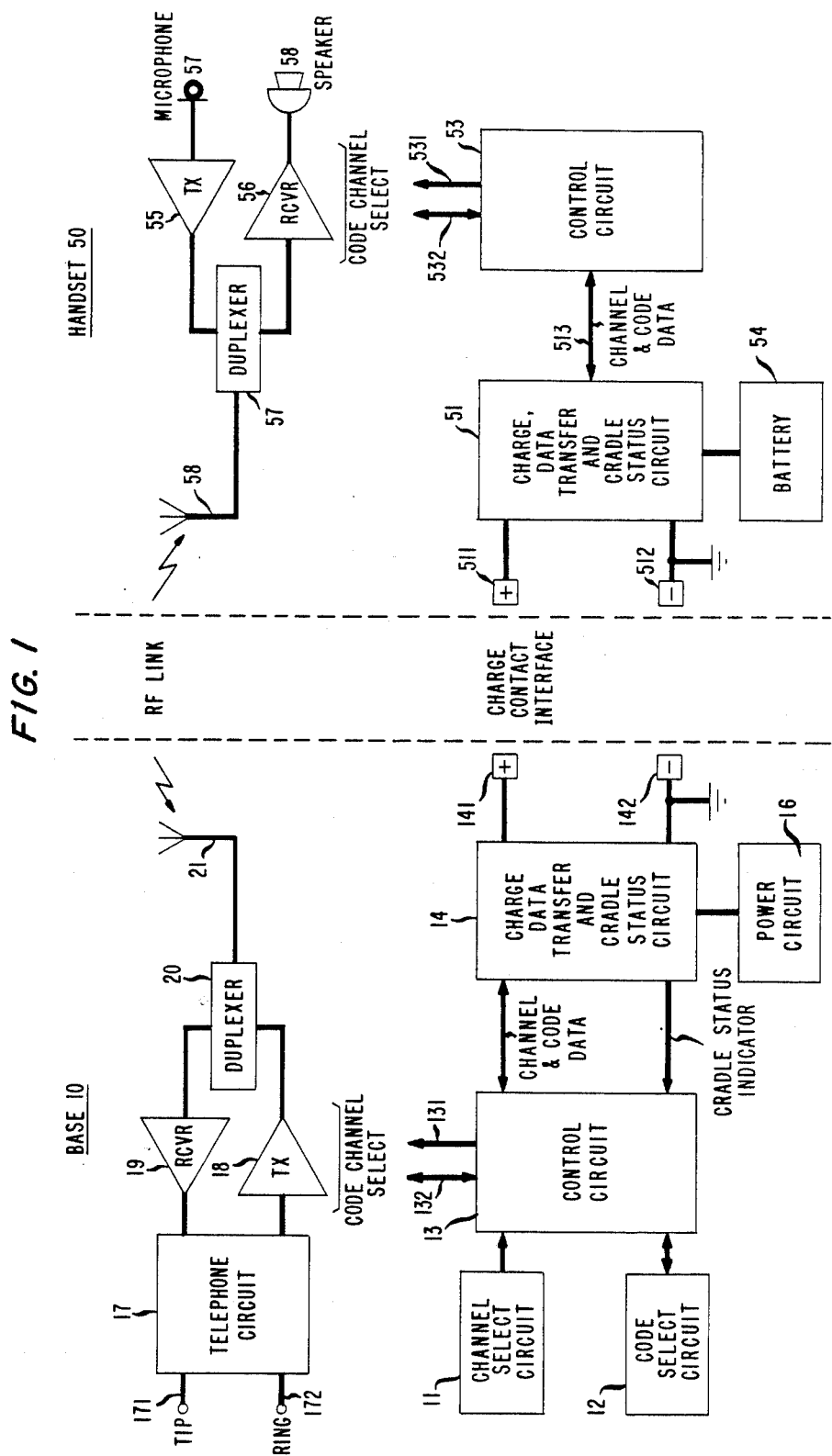
FIG. 1 is a functional block representation of a cordless telephone system incorporating a security arrangement operative in accordance with the principles of the present invention.

FIG. 1 is a functional block representation of a cordless telephone system incorporating a security arrangement operative in accordance with the principles of the invention. As shown, the cordless telephone system generally comprises a base unit 10 and a handset unit 50. Included in the base unit 10 is a channel select circuit 11 and a code select circuit 12 that may comprise either a series of settable switches or a memory for storing data that is generated or updated and retrieved by a microcomputer incorporated in the base unit 10. It will become apparent to those skilled in the art that channel select and code select circuits could alternatively be implemented in the handset unit 50 without departing from the spirit and scope of this invention.

The information in the channel select circuit 11 and the code select circuit 12 is accessed by control circuit 13 which processes the appropriate channel selection and appropriate security code data selected for use in the base unit 10. This control circuit 13 may be implemented quite easily through the use of only a 4-bit microprocessor. Such a microprocessor is well known in the art and is readily available from semiconductor manufacturers such as Hitachi, National and NEC.

Also included in the base unit 10 is a telephone circuit 17 that connects a transmitter 18 and a receiver 19 to a central office through tip and ring lines 171 and 172. The transmitter 18 and the receiver 19 respectively transmit to and receive signals from the handset unit 50, with the control circuit 13 providing the appropriate frequency channel information for this communication over line 131. The receive and transmit signals of the base unit 10 are coupled to a duplexer 20 which permits the transmitter 18 and the receiver 19 to both operate over antenna 21 while stopping the output power of transmitter 18 from being coupled directly into the input of the receiver 19.

Connected to the control circuit 13 is a charge, data transfer, and cradle status circuit 14. This circuit has three functions: it provides a charging path for charging a battery 54 in the handset unit 50 through a charge contact interface comprising contacts 141, 142, 511 and 512 from a power circuit 16; it allows for sending channel selection and security code data to the handset unit 50 or receiving this data from the handset unit 50 over the charge contact interface; and it monitors cradle status circuitry to be fully described later herein.

Contained in the handset unit 50 is a charge, data transfer and cradle status circuit 51 which is similar in function to the circuit 14 in the base unit 10. This circuit also has three functions: it monitors the cradle status of of the handset unit 50 ; it receives channel and security code data from the base unit 10; and acknowledges receipt of the data by echoing this same data back to the base unit 10 via the charge contact interface; and, along with the circuit 14, also provides a charging path for the power circuit 16 to charge the battery 54 via the charge contact interface.

A control circuit 53 in the handset unit 50 interfaces with circuit 51 over line 513 for receiving the appropriate channel selection and security code data. This control circuit 53 then stores in memory located therein the appropriate security code via line 531 and sets a transmitter 55 and a receiver 56 on the appropriate channels for communicating with the base unit 10. A microphone 57 and a speaker 58 provide audio input and output means for the transmitter 55 and receiver 56 respectively. The rf output of the transmitter 55 and input for receiver 56 is coupled to an antenna 58 through a duplexer 57.

Operation of the security arrangement in the cordless telephone system is such that when the handset unit 50 is returned to the cradle in the base unit 10 and the charge contact interface is established, circuit 14 detects that the handset unit 50 is present. It then waits for a prescribed period of time and loads the channel number and the code into the handset unit 50 via circuit 51. If the battery 54 is sufficiently charged to maintain operation of the handset unit 50 when the handset unit 50 is removed from the base unit 10, the control circuit 53 generates an acknowledge signal which is transmitted by the circuit 51 over the charge contact interface and via the circuit 14 to the control circuit 13 reflecting that the channel number and code have been received and are present in the handset unit 50. At this point in time, a user may remove the handset unit 50 from the base unit 10 and place a telephone call from the handset unit 50 through the base unit 10 to a central office via the tip and ring lines 171 and 172.

When such a call from the handset unit 50 to the base unit 10 is initiated, the security code stored in the control circuit 53 is provided to the transmitter 55 over line 532. This signal is transmitted over the rf link to receiver 19 where it is detected and provided to control circuit 13 over line 132. This control circuit 13 compares the received security code with the security code stored therein. If a favorable comparison of the two security codes is obtained by the control circuit 13, the telephone circuit 17 provides dial tone to the handset 50 enabling its user to place a telephone call.

The security code is also transmitted from the base unit 10 to the associated handset unit 50 upon receipt of ringing voltage on the tip and ring lines 171 and 172 to avoid actuating the ringers of other nearby handsets that are also on the same frequency as the base unit 50. When an incoming call is detected by the telephone circuit 17, this information is provided to the control circuit 13 over line 132. The control circuit 13 then provides the security code along with a ring signal via line 132 to the transmitter 18 for transmitting over the rf link to the receiver 56 in the handset 50. The received security code and the ring signal are both provided to the control circuit 53 over line 532. The received security code is compared in the control circuit 53 with the security code currently stored therein. Upon a favorable comparison of the two security codes, the control circuit 53 enables a ringer (not shown) in the handset 50 and provides the ring signal thereto for alerting a user of the incoming telephone call.

Figure 2:
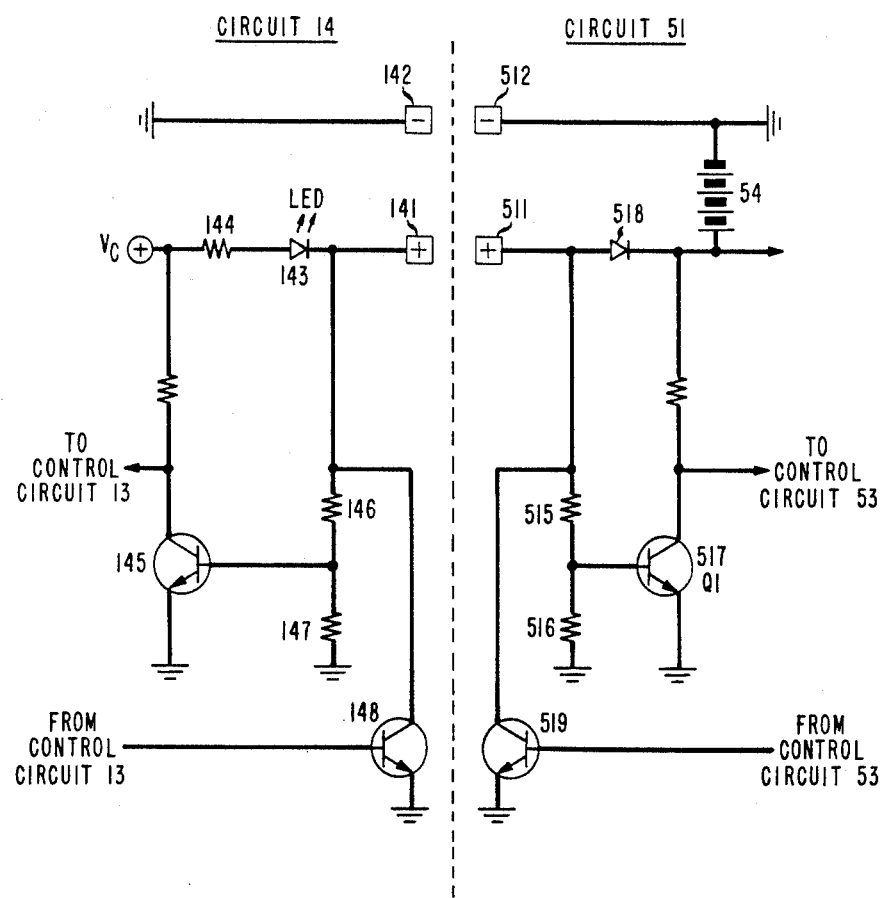
FIG. 2 is a schematic diagram showing some of the circuit components of the security arrangement in the base unit and the handset unit and their interrelationship to the other circuitry of the cordless telephone system of FIG. 1.

Referring now to FIG. 2, there is shown some of the circuit components of the security arrangement in the base unit 10 and the handset unit 50 and their interrelationship to the other circuitry of the cordless telephone system of FIG. 1. More specifically, there is shown circuitry within both the charge, data transfer and cradle status circuit 14 and the charge, data transfer and cradle status circuit 51. This circuitry provides the transfer interface for the security arrangements within the handset unit 50 and the base unit 10.

When the handset unit 50 is located remote from the base unit 10, the voltage potential on contact 511 is low and resistors 515 and 516 have values such that transistors 517 is off with its output being pulled high by the potential from battery 54 which is coupled thereto through resistor 520. When the handset unit 50 is placed in the cradle of the base unit 10 so that the charge contacts, 141 and 511, and 142 and 512, comprising the contact interface touch, contact 511 rises to the potential of the battery 54 plus one diode drop caused by diode 518. This causes transistor 517 to turn on and its output to go low. This low level signal is provided to the control circuit 53 as an indication that it can begin to perform the desired functions, such as switching from the active (talk) mode to the standby mode.

In the base unit 10, the charging voltage $V_c$ provided to the charging contacts from the power circuit 16 is designed to be significantly higher than the battery voltage and the voltage drops caused by the diode 518, the light emitting diode 143 and resistor 144. When the handset unit 50 is located remote from the base unit 10, the voltage on contact 141 is such that transistor 145 is biased on by resistors 146 and 147 with its output low.

When the handset unit 10 is placed in the cradle so that the charge contacts touch, the voltage on contact 141 drops to the potential of battery 54 plus the diode drop caused by diode 518. Transistor 145 turns off and its output goes high signaling the control circuit 13 that the handset unit 50 is in its cradle. The light emitting diode 143 also turns on, providing a signal indication to the user that the handset unit 50 has been properly placed in the cradle and that the charge path through the contact interface for the battery 54 has been correctly established.

The control circuit 13 allows adequate time for the control circuit 53 to change from the active to the standby mode, and will then start pulsing data through transistor 148 by switching it on and off. This, in turn, causes transistor 517 in the handset unit 50 to correspondingly switch off and on, thus transmitting the channel selection and security code data from the control circuit 13 to the control circuit 53. In the same fashion, transistor 519 is switched on and off by control circuit 53 to correspondly switch transistor 145 off and on when the data is acknowledged or transferred back from the handset unit 50 to control circuit 13 in the base unit 10.

Various other modifications of this invention are contemplated and may obviously be resorted to by those skilled in the art without departing from the spirit and scope of the invention as hereinafter defined by the appended claims.

What is claimed is:

1. A security arrangement for preventing unauthorized placing of telephone calls in a cordless telephone system over telephones lines associated with the system, the system including a base unit for connection to the telephone lines and for transmitting to and receiving signals from a remote unit associated with the base unit, the remote unit also transmitting to and receiving signals from the base unit, and the base unit being activatiable by the remote unit to cause dial tone to be transmitted to the remote unit for placing a telephone call therefrom, the security arrangement comprising:

means for storing a predetermined signal code in the base unit for preventing the base unit from responding to an unauthorized remote unit;

means located in the base unit for transmitting and in the associated remote unit for receiving the predetermined signal code over an electrical path established when the remote unit is brought in electrical contact with the base unit, the electrical contact being made entirely by a direct current charging path used for charging a battery in the remote unit, the remote unit storing the signal code for transmission back to the base unit when located remote from the base unit and requesting dial tone therefrom;

comparison means in the base unit for comparing the predetermined signal code stored therein with the signal code received from a remote unit requesting dial tone; and activation means in the base unit responsive to the comparison means, the activation means causing dial tone to be transmitted to the remote unit requesting dial tone when the signal code received from the remote unit is equivalent to the predetermined signal code stored in the base unit.

2. The security arrangement of claim 1 wherein the associated remote unit is brought into electrical contact with the base unit by placing the remote unit in a mating cradle in the base unit.

3. The security arrangement of claim 1 wherein a different predetermined signal code is stored in the base unit each time the associated remote unit is brought into electrical contact with the base unit, and wherein the base unit further comprises a random number generator for generating a random number for use as the different predetermined signal code, the random number being stored in memory in a code select circuit for comparison with a signal code received from the remote unit requesting dial tone.

4. The security arrangement of claim 1 wherein the means located in the base unit for transmitting the signal code further comprises a first transistor for providing a signal indication to a control circuit in the base unit when the associated remote unit is brought into electrical contact with the base unit, the first transistor providing an activation signal for initiating the transmitting of the predetermined signal code from the control circuit to the remote unit.

5. The security arrangement of claim 4 wherein the means located in the base unit for transmitting the signal code further comprises a second transistor coupled to the control circuit and responsive thereto for transmitting the signal code over the electrical contact made by the direct current charging path, the second transistor generating a serial data stream across the charging path by being pulsed off and on by the control circuit.

6. The security arrangement of claim 1 wherein the means located in the associated remote unit for receiving the signal code further comprises a first transistor for providing a signal indication to a control circuit in the remote unit when the remote unit is brought into electrical contact with the base unit, the first transistor providing an activation signal for switching the remote unit from a talk to a standby mode wherein the transmission of the predetermined signal code from the base unit to the control circuit in the remote unit is performed.

7. The security arrangement of claim 6 wherein the means located in the associated remote unit for transmitting the signal code further comprises means for transmitting an acknowledge signal back to the base unit for indicating receipt of the signal code, the acknowledge signal means comprising a second transistor coupled to the control circuit and responsive thereto for transmitting the signal code over the electrical contact made by the direct current charging path, and the second transistor generating a serial data stream across the charging path be being pulsed off and on by the control circuit.

8. The security arrangement of claim 1 wherein the signal code further includes a security code for establishing communications between the base unit and the associated remote unit, and frequency channel information for setting the transmitting and receiving signal frequency of the associated remote unit.

9. The security arrangement of claim 8 wherein the remote unit, upon receipt of the signal code from the base unit, sets its transmitting and receiving signal frequency and stores the security code for transmission back to the base unit when requesting dial tone therefrom.

10. A method of preventing unauthorized placing of telephone calls in a cordless telephone system over telephone lines associated with the system, the system including a base unit for connection to the telephone lines and for transmitting to and receiving signals from a remote unit associated with the base unit, the remote unit also transmitting to and receiving signals from the base unit, and the base unit being activatiable by the remote unit to cause dial tone to be transmitted to the remote unit for placing a telephone call therefrom, the method comprising the steps of:
  storing a predetermined signal code in the base unit for preventing the base unit from responding to an unauthorized remote unit;
  transmitting the predetermined signal code from the base unit and receiving the predetermined signal code in the associated remote unit over an electrical path established when the remote unit is brought in electrical contact with the base unit, and wherein the transmitting and receiving steps further comprise in combination the step of bringing into electrical contact the remote unit and the base unit entirely over a direct current charging path used for charging a battery in the remote unit;
  storing the signal code by the remote unit for transmission back to the base unit when the remote unit is located remoted from the base unit and requesting dial tone therefrom;
  comparing the predetermined signal code stored in the base unit with the signal code received from a remote unit requesting dial tone; and
  activating the base unit when the signal code received from the remote unit is found by the comparing step to be equivalent to the predetermined signal code stored in the base unit.

11. The method pursuant to claim 10 further comprising the step of bringing into electrical contact the handset unit with the base unit by placing the remote unit in a mating cradle on the base unit.

12. The method pursuant to claim 10 further comprising the step of storing a different predetermined signal code in the base unit each time the associated remote unit is brought into electrical contact with the base unit, the storing step further comprising a generating step for generating a random number for use as the different predetermined signal code, the random number being stored in memory in a code select circuit for comparison by the comparing step with a signal code received from the remote unit requesting dial tone.

13. The method pursuant to claim 10 wherein in the base unit the transmitting step further includes the steps of;
  providing a signal indication to a control circuit in the base unit reflecting when the associated remote unit is brought into electrical contact with the base unit, and
  providing an activation signal for initiating the transmitting of the predetermined signal code from the control circuit to the remote unit.

14. The method pursuant to claim 13 wherein in the base unit the transmitting step further includes the step of generating a serial data stream across the charging path by pulsing a transistor coupled to the control circuit and responsive thereto for transmitting the signal code over the electrical contact made by the direct current charging path.

15. The method pursuant to claim 10 wherein in the associated remote unit, the receiving step further includes the step of providing a signal indication to a control circuit in the remote unit reflecting when the remote unit is brought into electrical contact with the base unit, the signal indication step providing an activation signal for switching the remote unit from a talk to a standby mode whereby the transmission of the predetermined signal code from the base unit to the control circuit in the remote unit is performed.

16. The method pursuant to claim 15 wherein in the associated remote unit, the receiving step further includes the step of transmitting an acknowledge signal back to the base unit for indicating receipt of the signal code.

17. The method pursuant to claim 16 wherein the acknowledge signal is transmitted over the electrical contact made by the direct current charging path by pulsing the charging path off and on by the control circuit.

* * * * *